(12) United States Patent
Zhang

(10) Patent No.: US 9,082,197 B2
(45) Date of Patent: Jul. 14, 2015

(54) LOCAL IMAGE TRANSLATING METHOD AND TERMINAL WITH TOUCH SCREEN

(75) Inventor: Jing Zhang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/118,274

(22) PCT Filed: Oct. 18, 2011

(86) PCT No.: PCT/CN2011/080911
§ 371 (c)(1),
(2), (4) Date: Nov. 18, 2013

(87) PCT Pub. No.: WO2012/155446
PCT Pub. Date: Nov. 22, 2012

(65) Prior Publication Data
US 2014/0126820 A1 May 8, 2014

(30) Foreign Application Priority Data

Jul. 18, 2011 (CN) .......................... 2011 1 0202015

(51) Int. Cl.
*G06T 3/20* (2006.01)
*G06F 3/01* (2006.01)
(Continued)

(52) U.S. Cl.
CPC . *G06T 3/20* (2013.01); *G06F 3/016* (2013.01); *G06F 3/0488* (2013.01); *G06T 5/50* (2013.01);
(Continued)

(58) Field of Classification Search
CPC ....... G06F 3/016; G06F 3/0488; G06T 11/60; G06T 3/20; G06T 5/50; G06T 7/0081; G06T 2207/20101; G06T 2207/20104; G06T 2207/20141; G06T 2207/20144; G06T 2207/20212

USPC ......... 382/173, 131, 130, 128, 164, 204, 159, 382/275, 100
See application file for complete search history.

(56) References Cited

U.S. PATENT DOCUMENTS 7,421,125 B1    9/2008  Rees
8,543,940 B2 *  9/2013  Singhal et al. ................ 715/809
(Continued)

FOREIGN PATENT DOCUMENTS

CN    101089800 A    12/2007
CN    101644986 A     2/2010

OTHER PUBLICATIONS

Michael Donoser et al., "Saliency Driven Total Variation Segmentation"; 2009 IEEE 12th International Conference on Computer Vision (ICCV) pp. 817-824.*

(Continued)

*Primary Examiner* — Mekonen Bekele
(74) *Attorney, Agent, or Firm* — Ling Wu; Stephen Yang; Ling and Yang Intellectual Property

(57) ABSTRACT

The invention provides a method for local image translation and a terminal with a touch screen, wherein the method for local image translation includes: obtaining a region to be translated from an original image; extracting a region with a remarkable characteristic through performing cluster analysis on the region; performing region growing according to the region with the remarkable characteristic to generate a target region; and fusing the target region translated to the target image with the target image. The above method for local image translation and the terminal with the touch screen can be used for translating the local images in various types of images.

6 Claims, 2 Drawing Sheets

(51) Int. Cl.
*G06F 3/0488* (2013.01)
*G06T 5/50* (2006.01)
*G06T 7/00* (2006.01)
*G06T 11/60* (2006.01)

(52) U.S. Cl.
CPC .............. *G06T 7/0081* (2013.01); *G06T 11/60* (2013.01); *G06T 2207/20101* (2013.01); *G06T 2207/20104* (2013.01); *G06T 2207/20141* (2013.01); *G06T 2207/20144* (2013.01); *G06T 2207/20212* (2013.01)

(56) References Cited

U.S. PATENT DOCUMENTS

| | | | |
|---|---|---|---|
| 2003/0198382 A1* | 10/2003 | Chen et al. | 382/173 |
| 2004/0228542 A1* | 11/2004 | Zhang et al. | 382/275 |
| 2005/0180645 A1* | 8/2005 | Hasegawa et al. | 382/239 |
| 2005/0286766 A1* | 12/2005 | Ferman | 382/190 |
| 2006/0044285 A1 | 3/2006 | Sato et al. | |
| 2006/0153451 A1* | 7/2006 | Hong et al. | 382/173 |
| 2007/0257939 A1 | 11/2007 | Fan | |
| 2008/0044072 A1* | 2/2008 | Kiraly et al. | 382/128 |
| 2008/0100720 A1* | 5/2008 | Brokish et al. | 348/222.1 |
| 2009/0169074 A1* | 7/2009 | Avinash et al. | 382/128 |
| 2009/0175543 A1* | 7/2009 | Nielsen | 382/204 |
| 2009/0279752 A1* | 11/2009 | Sirohey et al. | 382/128 |
| 2010/0226566 A1* | 9/2010 | Luo et al. | 382/164 |
| 2010/0232686 A1* | 9/2010 | Dewan et al. | 382/159 |
| 2011/0206257 A1* | 8/2011 | Qanadli et al. | 382/130 |
| 2012/0263433 A1* | 10/2012 | Mei et al. | 386/241 |
| 2012/0275701 A1* | 11/2012 | Park et al. | 382/173 |
| 2013/0011037 A1* | 1/2013 | Shi et al. | 382/131 |
| 2013/0223760 A1* | 8/2013 | Jiang et al. | 382/284 |

OTHER PUBLICATIONS

International Search Report for PCT/CN2011/080911 dated Mar. 29, 2012.
"Information-Theoretic Analysis of Input Strokes in Visual Object Cutout"; IEEE Transactions on Multimedia, vol. 12, No. 8, Dec. 2010; Yadong Mu, Bingfeng Zhou, and Shuicheng Yan, Senior Member, IEEE; see pp. 843-852.
"GrabCut-Interactive Foreground Extraction using Iterated Graph Cuts"; Carsten Rother et al.; XP-002340109; see pp. 309-314.
"Selecting Objects With Freehand Sketches"; Kar-Han Tan et al.; see pp. 337-344.
"Saliency Driven Total Variation Segmentation"; Michael Donoser et al.; see pp. 817-824.

* cited by examiner

LOCAL IMAGE TRANSLATING METHOD AND TERMINAL WITH TOUCH SCREEN

TECHNICAL FIELD

The present document relates to image segmentation technologies, and in particular, to a method for local image translation and a terminal with a touch screen.

BACKGROUND OF THE RELATED ART

In the field of image processing, image segmentation is a very important direction, and local image translation belongs to one image segmentation technology. The image segmentation technology primarily studies a method for separating a target image from an original image, which can roughly be divided into two categories, i.e., pixel stage segmentation and regional stage segmentation. A basic unit of the image is a pixel point, and the pixel stage based image segmentation categorizes the points together which have similar pixel stages on the consideration of continuity and similarity on the pixels of the image, to implement image segmentation; and the region based image segmentation uses technologies such as template matching etc., to separate the target image from the original image, on condition that a shape of the target image is known.

In existing image segmentation technologies, supervised segmentation is performed on the existing features of the target image, or unsupervised blind segmentation is performed in the case that the target features are unknown, which has high complexity. For the cell phone image segmentation applied to the user of a cell phone with a touch screen, as the types of the image which is obtained by selection are not unique, the features of the image can not be described qualitatively and quantitatively, and the efficiency of the segmentation is low and the effect of the segmentation is poor.

SUMMARY OF THE INVENTION

The present document provides a method for local image translation and a terminal with a touch screen, to overcome the defect that the existing method for image processing can only extract a single type of image.

The present document provides a method for local image translation, comprising:

obtaining a region to be translated from an original image;

extracting a region with a remarkable characteristic through performing cluster analysis on the region;

performing region growing according to the region with the remarkable characteristic to generate a target region; and fusing the target region translated to the target image with the target image.

Preferably, when the target image and the original image are the same image, after generating the target region and before fusing the target region with the target image, the method further comprising:

restoring a background of the original image.

Preferably, the step of extracting a region with a remarkable characteristic through performing cluster analysis on the region comprises:

using an affinity propagation clustering algorithm to perform cluster analysis on the region, to obtain a category cluster; and determining a remarkable characteristic parameter according to the category cluster, and obtaining the region with the remarkable characteristic according to the remarkable characteristic parameter.

Preferably, an equation for calculating the remarkable characteristic parameter is as follows:

$$P(i) = \frac{C_i}{\sum_{j=1}^{n} C_j}$$

wherein, P(i) is the remarkable characteristic parameter, i and j are positive integers, and $C_i$ is the category cluster.

Preferably, the step of obtaining a region to be translated from an original image comprises:

receiving a region selected from the original image, performing normalizing processing on the region, and forming the region to be translated.

The present document further provides a terminal with a touch screen, comprising:

an obtaining module, configured to obtain a region to be translated from an original image;

an extracting module, configured to extract a region with a remarkable characteristic through performing cluster analysis on the region;

a growing module, configured to perform region growing according to the region with the remarkable characteristic to generate a target region; and a fusing module, configured to fuse the target region translated to the target image with the target image.

Preferably, the terminal further comprises:

a restoring module, configured to restore a background of the original image after the growing module generates the target region and before the fusing module fuses the target region with the target image, when the target image and the original image are the same image.

Preferably, the extracting module is configured to use an affinity propagation clustering algorithm to perform cluster analysis on the region, to obtain a category cluster; and determine a remarkable characteristic parameter according to the category cluster, and obtain the region with the remarkable characteristic according to the remarkable characteristic parameter.

Preferably, an equation for calculating the remarkable characteristic parameter is as follows:

$$P(i) = \frac{C_i}{\sum_{j=1}^{n} C_j}$$

wherein, P(i) is the remarkable characteristic parameter, i and j are positive integers, and $C_i$ is the category cluster.

Preferably, the obtaining module is configured to receive a region selected from the original image, perform normalizing processing on the region, and form the region to be translated.

The method for local image translation and the terminal with a touch screen above can translate the local image in various types of images.

PREFERRED EMBODIMENTS OF THE INVENTION

The embodiments of the present document will be described in detail in conjunction with accompanying drawings hereinafter. It should be illustrated that, embodiments in the present application and features in the embodiments can be combined with each other without conflict.

The method provided by the embodiments of the present document enables the user of the terminal to obtain better user experience only by clicking or cycling on the screen of the terminal slightly without copying the pictures stored in the terminal in and out.

The embodiments of the present document provide a method for local image translation, comprising the following steps.

In step one, a region to be translated is obtained from an original image;

this step can be: receiving a region selected from the original image by a user, performing normalizing processing on the region, and forming the region to be translated;

In step two, a region with a remarkable characteristic is extracted through performing cluster analysis on the region;

this step can be: using an affinity propagation clustering algorithm to perform cluster analysis on the region, to obtain a category cluster; and determining a remarkable characteristic parameter according to the category cluster, and obtaining the region with the remarkable characteristic according to the remarkable characteristic parameter;

In step three, region growing is performed according to the region with the remarkable characteristic to generate a target region;

this step can be: extracting a pixel collection of the image from the region with the remarkable characteristic, and using the pixel collection as a seed collection for region growing, and generating the target region starting from the seed collection;

In step four, the target region which is translated to the target image is fused with the target image.

After the target region is translated to the target image, the target region is fused with the target image, to complete the translation of the image.

When the above original image and the target image are the same image, the translation in the image is implemented; and when the above original image and the target image are not the same image, the translation between images is implemented.

Figure 1:
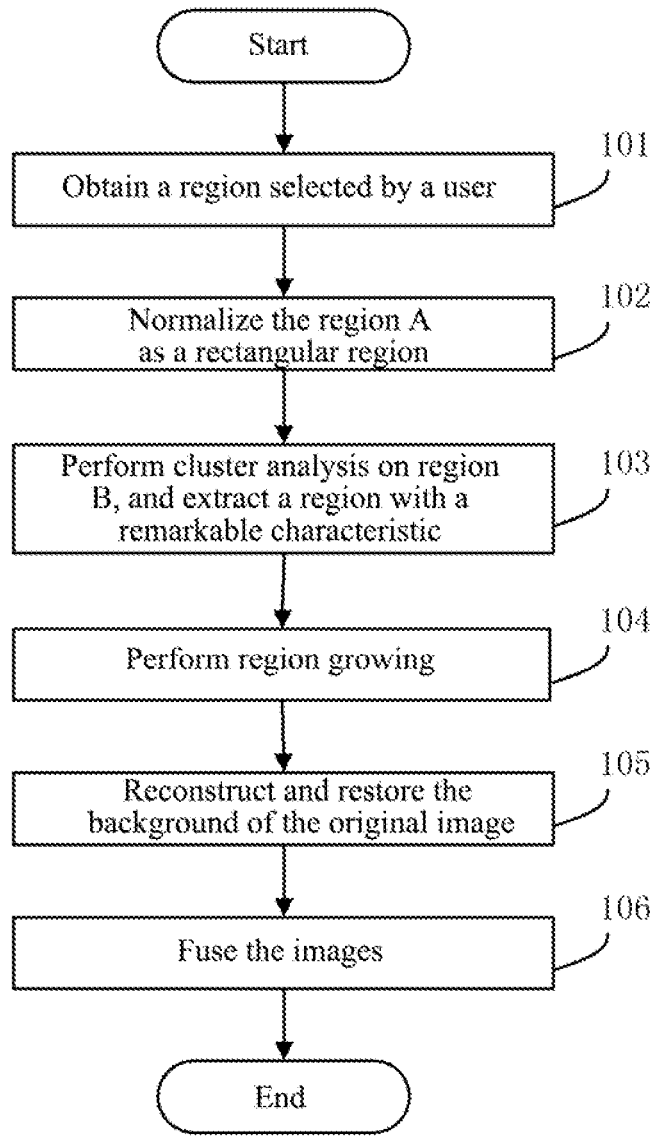
FIG. 1 is a flowchart of an embodiment of a method for translation in an image according to the present document.

As shown in FIG. 1, a flowchart of an embodiment of a method for translation in an image according to the present document is illustrated, and the method comprises the following steps.

Figure 2:
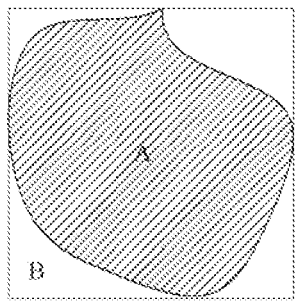
FIG. 2 is a diagram of a simulation of a user touching a selected region using a finger according to an embodiment of the present document.

In step 101, a region selected by a user is obtained, shown as A in FIG. 2;

the user touches the screen of the terminal, and the terminal obtains the region selected by the user;

in step 102, in order to facilitate the subsequent cluster analysis of the image, the region A is normalized as a rectangular region, shown as B in FIG. 2;

in step 103, the cluster analysis is performed on the region B, to extract a region with a remarkable characteristic;

The level of similarity between pixels of the image in the rectangular region B is calculated, and the level of similarity is used as an input parameter of the method for image cluster analysis; and the cluster analysis is performed on the region B according to a cluster criterion, to obtain the region with the remarkable characteristic, i.e., a part of the target region;

The efficiency and performance for extracting the target region largely depend on the selection of the cluster algorithm. Traditional cluster algorithms include K-means, C-mean, fuzzy clustering etc., and the effects to be achieved by the present application can be implemented from the cluster performance point, however, for the application of extracting the target image for a user of the terminal, the calculation efficiency of the above algorithms is low generally, which can hardly satisfy high effective extraction of the target image. Therefore, the present document uses an affinity propagation clustering algorithm with high efficiency, and therefore, the process of extracting the target region with the remarkable characteristic is as follows:

First of all, a level of similarity between pixels of an image in a region B is calculated, and the level of similarity is defined as follows:

$$s(i,k) = e^{-\|x_i - x_k\|^2}$$

wherein, $X_i$ and $X_k$ represent pixel vectors of $i^{th}$ and $k^{th}$ pixel points in the region B respectively.

Then, iteration parameters of the cluster method are as follows respectively:

$$r(i, k) \leftarrow s(i, k) - \max_{k' \neq k}\{a(i, k') + s(i, k')\}$$

$$a(i, k) \leftarrow \min\left\{0, r(k, k) + \sum_{i' \notin \{i,k\}} \max\{0, r(i', k)\}\right\}$$

C(i,k)=r(i,k)+a(i,k) is defined, for a data point $X_i$, if c(i,k) reaches a maximum value, $X_i$ belongs to a category with $X_k$ as a cluster center.

The iteration is performed as above, and the algorithm ends and n category clusters $C_1, C_2, \ldots, C_n$, are output until a category cluster with $c_1, c_2, \ldots, c_n$ as cluster centers is determined, or a predefined iteration number is achieved.

Finally, a remarkable characteristic parameter is defined as follows:

$$P(i) = \frac{C_i}{\sum_{j=1}^{n} C_j}$$

In order not to translate the target for the region without an obvious characteristic in the selected region, a remarkable characteristic threshold T is set, i.e., if $$\max_{1 \leq i \leq n}\{P_i\} < T,$$

it is considered that there is no obvious characteristic in the currently selected region, the local image translation is not performed, and the method ends; otherwise, if $$P_m = \max_{1 \leq i \leq n} \{P_i\},$$

the $C_m$ category cluster is considered as a remarkable characteristic category cluster, and the region where the pixels in the category cluster are located is selected as a part of the target region.

Figure 3:
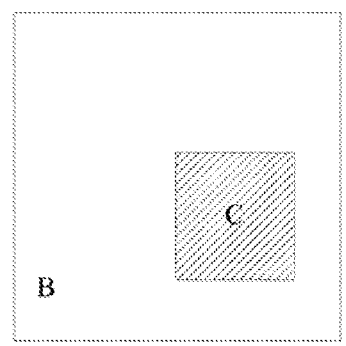
FIG. 3 is a diagram of a seed collection in a selected region with a remarkable characteristic according to an embodiment of the present document.

In step 104, the region growing is performed;

The part of the target region is determined in step 103, and in order to implement a complete translation of the target region in the range of the original image, the whole target region needs to be further determined, and the morphology algorithm—region growing is used here. The basic idea of the region growing is that a collection of pixels with similarity are gathered together to construct a region. Specifically, one seed sub-pixel is found as a growth starting point for each region needed to be segmented, then the seed sub-pixel and pixels in the adjacent region which have the same or similar properties as the seed sub-pixel are incorporated into the seed sub-pixel region. A region C in the part of the target region determined in step 103 is a feed collection, wherein, the region C is shown in FIG. 3, and the specific implementation mode is as follows:

first of all, the images are scanned sequentially, and a first pixel point $X_0$ which does not belong to region B is found;

then, an average level of similarity between $X_0$ and all pixels in the region C is calculated as follows:

$$S_0 = \underset{x_i \in C}{\text{media}}\left\{e^{-\|x_i - x_0\|^2}\right\}$$

Finally, if $S_0$ is less than a certain threshold, $X_0$ and region B are incorporated.

The above operations are repeated, until the scan of the image is completed.

The above region growing may generate many small block regions, and further in consideration with the adjacent characteristic of the same target in distance, the result of the above region growing is further filtered, and the whole target region is determined finally. In order to facilitate the subsequent seamless fusion between the target image and the background image, the edge diffusion process is performed on the edge of the above determined target region to remove an abrupt and burred edge, so that the edge is more smooth.

In step 105, the background of the original image is reconstructed and restored;

After separating the target region from the original image, the original image will become discontinuous, and in order to ensure the integrity of the background of the original image when the target region is translated, the background of the original image is modeled and restored here, specifically using a method of image interpolation.

In step 106, the images are fused.

After performing the above steps, the target region is determined, the background of the original image is reconstructed, and the user can drag and translate the target region to a random location and release the image, and seamless fusion is performed finally on the target region and the original image in the region released by the user to implement local image translation, and the procedure ends.

Figure 4:
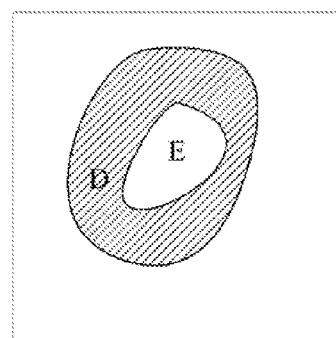
FIG. 4 is a diagram of a simulation of a user circling a selected region using a finger according to an embodiment of the present document.

The difference between the method for implementing translation between images and the method for implementing translation in the image is that, the translation between the images needs not to restore the background of the original image; and by example of FIG. 4 below, the procedure of local image translation between the images will be described simply, which comprises the following steps:

in step 201, a user circles a local image region which is used to be translated to another image using a finger, shown as D in FIG. 4;

in step 202, a region E with a remarkable characteristic in the region D is extracted and recorded;

in step 203, region growing is performed according to the region E with the remarkable characteristic;

The growing procedure thereof is the same as step 104 in the above embodiments, and will be not described here any more;

In step 204, the user drags the region D to any location of another image (i.e., target image) and releases the region, and then the region on which the region growing is performed is fused with the target image.

Compared with the prior art, the embodiments of the present document introduce priori effective information such as a region used by a user, so that the efficiency of using the cluster based image segmentation algorithm is improved. Meanwhile, a pixel point collection is selected from the part of the target region as the seed collection for the region growing, which accelerates the speed of the region generation and the reliability of the region generation. In addition, the above method provides a new method for local image translation for a user of the terminal with a touch screen, which is convenient to the user operation, and enables the user to achieve the effect of stitching and synchronization of various images, and enhances the user experience.

Figure 5:
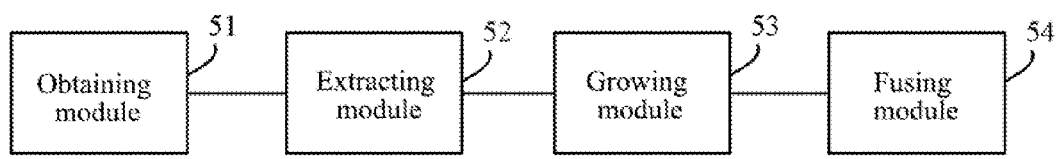
FIG. 5 is a diagram of a structure of an embodiment of a terminal with a touch screen according to the present document.

As shown in FIG. 5, it is a diagram of a structure of an embodiment of a terminal with a touch screen according to the present document, which comprises an obtaining module 51, an extracting module 52, a growing module 53 and a fusing module 54, wherein, the obtaining module 51 is configured to obtain a region to be translated from an original image;

the extracting module 52 is configured to extract a region with a remarkable characteristic through performing cluster analysis on the region;

the growing module 53 is configured to perform region growing according to the region with the remarkable characteristic to generate a target region; and the fusing module 54 is configured to fuse the target region translated to the target image with the target image.

In addition, when the target image and the original image are the same image, the terminal further comprises:

a restoring module, configured to restore a background of the original image after the growing module generates the target region and before the fusing module fuses the target region with the target image.

Specifically, the extracting module is configured to use an affinity propagation clustering algorithm to perform cluster analysis on the region, to obtain a category cluster; and determine a remarkable characteristic parameter according to the category cluster, and obtain the region with the remarkable characteristic according to the remarkable characteristic parameter.

Wherein, an equation for calculating the remarkable characteristic parameter is as follows:

$$P(i) = \frac{C_i}{\sum_{j=1}^{n} C_j}$$

wherein, P(i) is the remarkable characteristic parameter, i and j are positive integers, and $C_i$ is the category cluster.

Specifically, the obtaining module is configured to receive a region selected from the original image, perform normalizing processing on the region, and form the region to be translated.

The above terminal with a touch screen can translate the local image in various types of images.

A person having ordinary skill in the art can understand that all or a part of steps in the above method can be implemented by programs instructing related hardware, and the programs can be stored in a computer readable storage medium, such as a read-only memory, disk or disc etc. Alternatively, all or a part of steps in the above embodiments can also be implemented by one or more integrated circuits. Accordingly, each module/unit in the above embodiments can be implemented in a form of hardware, and can also be implemented in a form of software functional module. The present document is not limited to a combination of any particular forms of hardware and software.

The above embodiments are only used to illustrate the technical schemes of the present document without limitation, and the present document is described in detail only with reference to preferable embodiments. Those of ordinary skill in the art should understand that modifications or equivalent substitutions can be made for the technical schemes of the present document without departing from the spirit and scope of the technical schemes of the present document, all of which should be contained in the scope of the claims of the present document.

INDUSTRIAL APPLICABILITY

The method for local image translation and the terminal with a touch screen above can translate the local image in various types of images, which enables the user of the terminal to obtain better user experience only by clicking or cycling on the screen of the terminal slightly without copying the pictures stored in the terminal in and out.

What is claimed is:

1. A method for local image translation, comprising:
   obtaining, by a terminal, a region to be translated from an original image;
   extracting, by the terminal, a region with a remarkable characteristic through performing cluster analysis on the region;
   performing, by the terminal, region growing according to the region with the remarkable characteristic to generate a target region; and
   fusing, by the terminal, the target region translated to a target image with the target image;
   wherein,
   the step of extracting a region with a remarkable characteristic through performing cluster analysis on the region comprises:
   using an affinity propagation clustering algorithm to perform cluster analysis on the region, to obtain a category cluster; and
   determining a remarkable characteristic parameter according to the category cluster, and obtaining the region with the remarkable characteristic according to the remarkable characteristic parameter;
   wherein
   an equation for calculating the remarkable characteristic parameter is as follows:

$$P(i) = \frac{C_i}{\sum_{j=1}^{n} C_j}$$

wherein, P(i) is the remarkable characteristic parameter, i and j are positive integers, and $C_i$ is the category cluster.

2. The method according to claim 1, wherein,
   when the target image and the original image are the same image, after generating the target region and before fusing the target region with the target image, the method further comprises:
   restoring, by the terminal, a background of the original image.

3. The method according to claim 1, wherein,
   the step of obtaining a region to be translated from an original image comprises:
   receiving a region selected from the original image, performing normalizing processing on the region, and forming the region to be translated.

4. A terminal with a touch screen, comprising a processor, and a memory storing instructions that, when executed, cause the terminal to:
   obtain a region to be translated from an original image;
   extract a region with a remarkable characteristic through performing cluster analysis on the region;
   perform region growing according to the region with the remarkable characteristic to generate a target region; and
   fuse the target region translated to a target image with the target image;
   wherein the instructions cause the terminal to:
   use an affinity propagation clustering algorithm to perform cluster analysis on the region, to obtain a category cluster; and determine a remarkable characteristic parameter according to the category cluster, and obtain the region with the remarkable characteristic according to the remarkable characteristic parameter;
   an equation for calculating the remarkable characteristic parameter is as follows:

$$P(i) = \frac{C_i}{\sum_{j=1}^{n} C_j}$$

wherein, P(i) is the remarkable characteristic parameter, i and j are positive integers, and $C_i$ is the category cluster.

5. The terminal according to claim 4, wherein
   the instructions further cause the terminal to restore a background of the original image after the growing module generates the target region and before the fusing module fuses the target region with the target image, when the target image and the original image are the same image.

6. The terminal according to claim 5, wherein,
   the instructions cause the terminal to receive a region selected from the original image, perform normalizing processing on the region, and form the region to be translated.

* * * * *